Patented Jan. 25, 1938

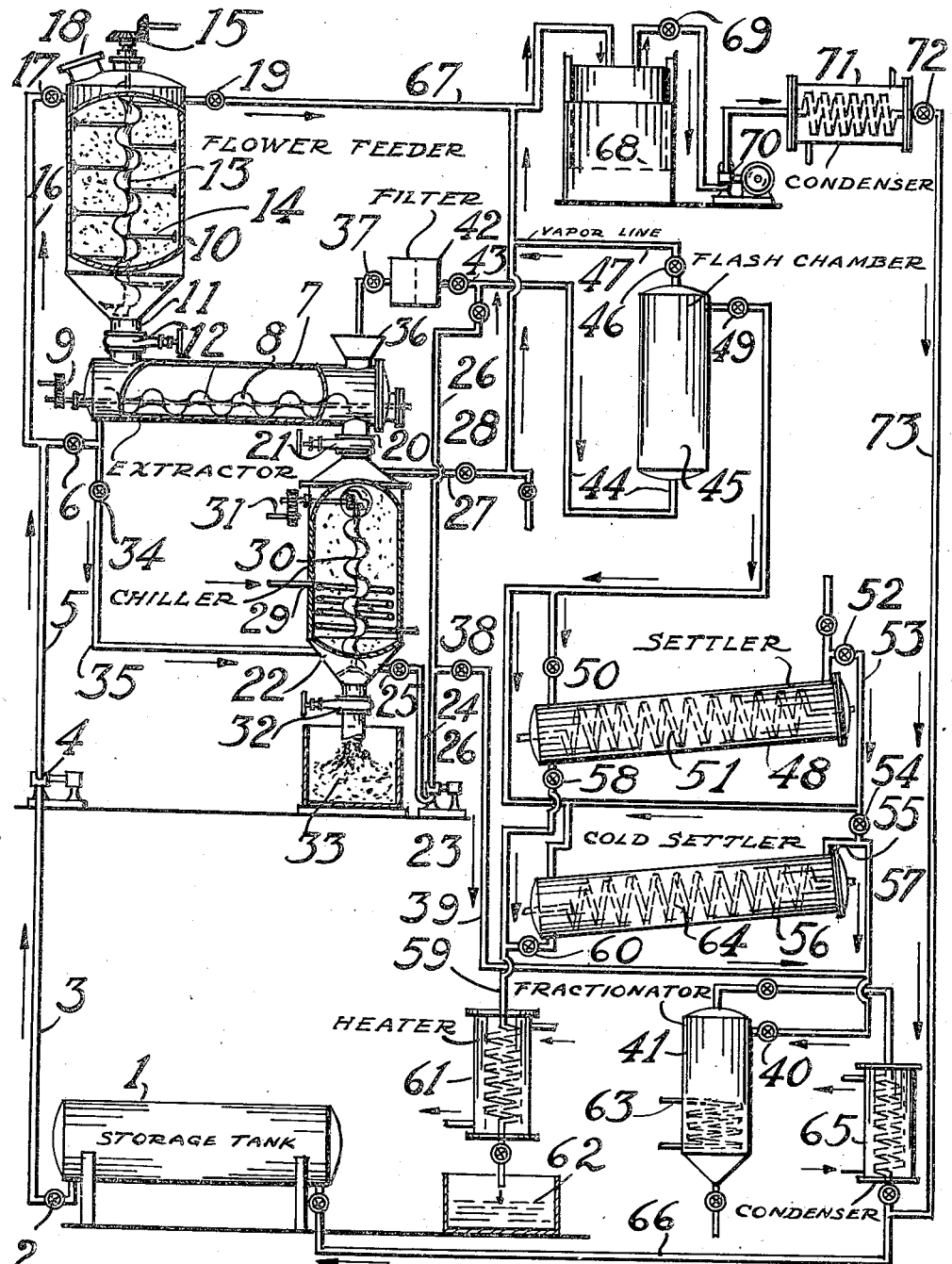

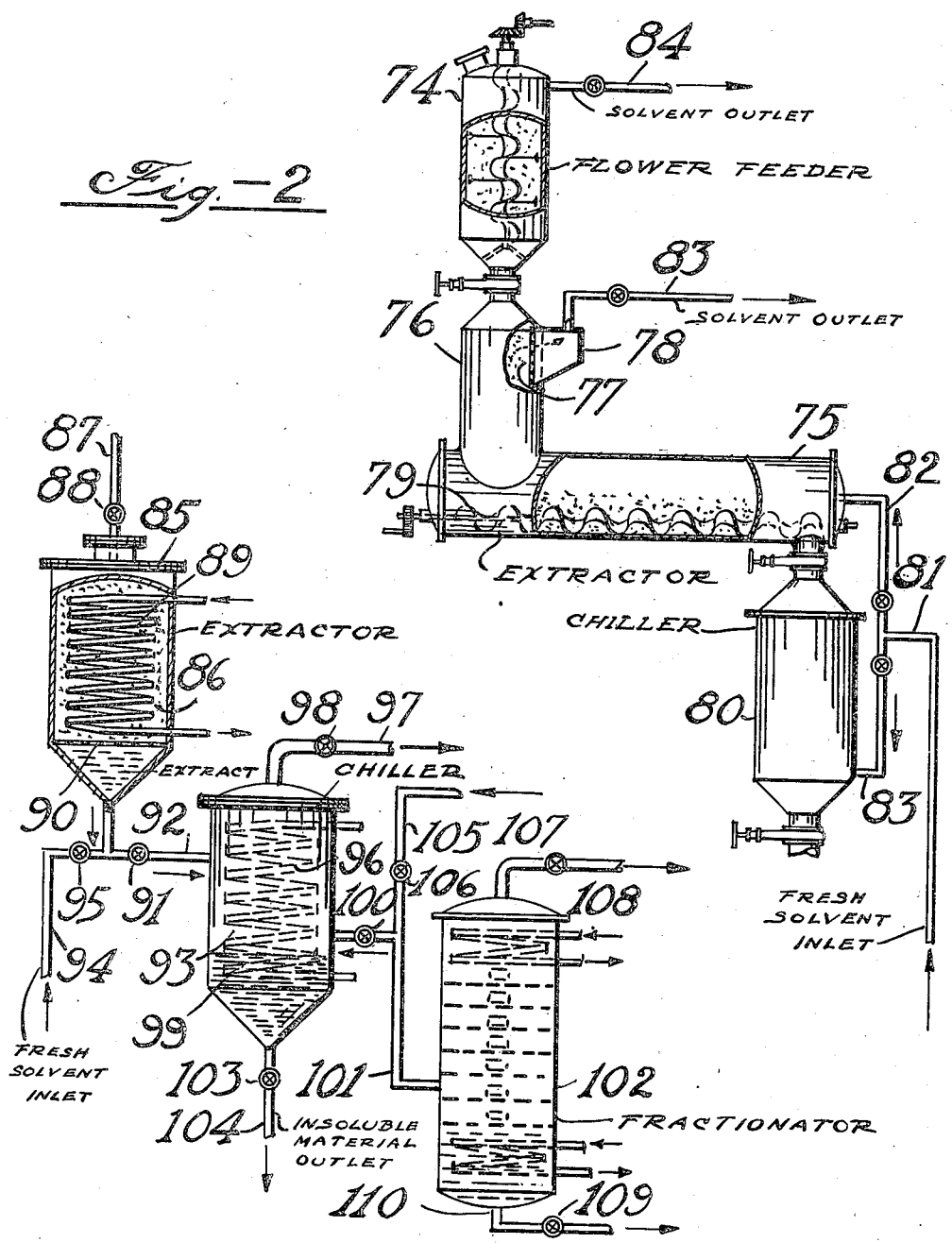

2,106,200

UNITED STATES PATENT OFFICE 2,106,200

METHOD OF EXTRACTING PERFUME MATERIALS UNSTABLE TO HEAT

Philip L. Young, Westfield, and Peter J. Wiezevich, Elizabeth, N. J., now by judicial change of name Peter J. Gaylor, assignors to Standard Oil Development Company, a corporation of Delaware Application October 3, 1935, Serial No. 43,324

4 Claims. (Cl. 87—28)

This invention relates to the extraction of unstable principles from plants, animal tissues, etc., and the recovery of such materials in a pure, concentrated form without undergoing an excessive number of operations which would tend to cause deterioration of said principles, or involve the excessive cost now encountered in this art. More specifically this invention involves the use of light hydrocarbons such as propane, butane, etc. in the extraction, purification and treating of substances which are decidedly unstable to heat, light, air, etc.

An object of the invention is to provide a simple, inexpensive method for extracting unstable materials (i. e. those beginning to decompose in the neighborhood of 150–200° F.) such as perfumes, vitamins, essential oils, animal, vegetable and fish extracts, etc. in purity and strength heretofore unattainable. In the perfume industry, for example, at the present time, only certain few flowers available only in foreign lands can be employed for the preparation of perfume ingredients. One of the common methods of extraction consists in immersing a perforated basket containing the picked flowers in hot petroleum ether, then evaporating the ether under high vacuum. The resulting product generally termed as the "concrete" is generally of a semi-solid nature containing only a small proportion of the desired essence. This is usually extracted with alcohol in which most of the inert material is insoluble, and the extract is distilled to remove the alcohol, leaving behind the essence, generally known as the "absolute". The proportion of the final product is usually in the neighborhood of only a fraction of a percent of the original flowers extracted.

An objection to this process is that the temperature necessary for the extraction is too high, causing decomposition of the desired essence as well as contamination of the extract with inert and undesirable constituents such as resins, waxes, etc. Another objection is that petroleum ether possesses a high solvency for inert compounds such as resins, colored bodies, etc. which detrimentally affect the quality of the product.

Another method known as the "enfleurage process" often employed for rose petals and other very delicate raw materials consists in packing alternate layers of petals and wax or lard or other semi-solid solvent, allowing the containers to stand over a period of weeks or months, and then steam distilling out the essence from the solvent under vacuum. Objections to this process are that considerable time is taken up in waiting for the diffusion to reach an equilibrium. Since a large plant investment is involved, this factor is of considerable importance. There are also objections to subjecting the materials to steam distillation temperatures.

According to the present invention, extraction of the essence is accomplished by a low boiling hydrocarbon such as ethane, ethylene, propane, propylene, butane, butylenes, cyclo-propane or cyclo-butane, etc. The hydrocarbon solvent must necessarily possess 2 to 4 carbon atoms per molecule. Either the pure individual hydrocarbons or mixtures thereof may be employed. By the use of these materials, extraction may be easily carried out at room temperature or at 0° F. or —20° F. or even —80° F. or lower, as desired. Unlike the higher molecular weight hydrocarbons, these solvents are highly selective for the essences desired, and are especially immiscible with resins, coloring materials, etc., resulting in the extraction of clear, light, concentrated and pure essences. Furthermore, by a combination of temperature adjustments, it is possible to obtain very pure products without subjecting the compounds to be extracted to severe conditions. Also, a large number of domestic flowers and other raw materials heretofore considered valueless commercially are now made available for extraction by the present invention.

Figure 1 shows a semi-countercurrent method for carrying out the invention, while Fig. 2 illustrates a modification thereof. A batch method for achieving a similar result is shown in Fig. 3. Referring to Figure 1, the process may be operated semi-continuously as follows:

Propane or any other light hydrocarbon stored in pressure container 1 is pumped through valve 2, line 3 by pump 4 through line 5 and valve 6 into extractor 7 equipped with a screw conveyor such as 8 rotated by driving means 9. Flowers or other material to be extracted are stored in vessel 10 connected to extractor 7 by nipple 11 equipped with valve 12. When valve 12 is open, flowers may be continuously fed into extractor 7 from feeding vessel 10 by rotating screw conveyor 13 which is also equipped with alternate side arms 14 which prevent clinging of the flowers to the side of the vessel. The conveyor is rotated by driving mechanism 15. Ordinarily, the liquid solvent is not allowed to enter feeder vessel 10, although in some cases with materials difficult to feed in the dry state, it is more advantageous to also force liquid solvent into the vessel through line 16 and valve 17.

As soon as the supply of flowers is exhausted in feeder vessel 10, valve 12 may be closed, valve 19 opened to allow reduction of the pressure by bleeding off the solvent vapors, and fresh flowers added through opening 18.

Upon completion of extraction of the flowers in extractor 7, the spent flowers are forced by conveyor 8 into nipple 20, having valve 21 open for that purpose, and into chilling vessel 22 for removal of the solvent. This is accomplished by closing valve 21 and pumping off the liquid solvent by pump 23 from line 24 through valve 25 and into line 26. When all of the liquid is removed, valve 25 is closed and the pressure of the vapor is bled off through valve 27 into vapor line 28. The solvent-free flowers are then removed from the vessel by rotating screw conveyor 30 driven by 31, forcing them through opened valve 32 into container 33. A coil (29) is provided for introducing heat or refrigeration. It is often desired to dry the flowers or to distill off other higher boiling solvents which may have been added. This is done by introducing steam into coil 29 and collecting the vapors from 27, condensing them if necessary.

If it is desired to precipitate out resins, wax, etc. on the spent flowers, refrigerant may be introduced into coil 29 and in that case the dewaxed solution may be run semi-continuously from extractor 7 through open valve 21, into chiller 22, thence through line 24, valve 25, pump 23, valve 38, line 39, valve 40 into fractionator 41 where the extract is freed from the solvent. It is desirable to have valve 37 closed during this operation. Fresh propane may be introduced into line 35 through valve 34 to wash the contents of chilling vessel 22.

However, if it is not desired to dewax or deresinify in vessel 22, then the normal course for the extract stream leaving extractor 7 is to pass through separating zone 36, through valve 37, filter 42, valve 43, line 44 into a flash chamber 45 (if desired). Here some of the light solvent may be vaporized by reduction of pressure allowing vaporized solvent to leave through valve 46, line 47 into vapor line 28. The mixture thus cooled is then run into settler 48 via valves 49 and 50. This vessel is preferably cooled by coil 51. The wax, resins, etc. settle out as a layer while the supernatant liquid is drawn off through valve 52, line 53, thence into another cold settler 56 via valve 54 and line 55 or through line 57 into fractionator 41 where the solvent is removed from the extract or "absolute." The wax, etc. may be drawn out of settlers 48 and 56 through valves 58 and 60 and line 59 into heater 61 (if desired) and allowed to collect in vessel 62. It is also possible to heat one of the settlers by introducing steam through coils 51 or 64 and melting out the wax, while the other settler is being cooled. Coil 63 is provided for heating the extract when heat is desired to volatilize the solvent, the cooling of the vapors taking place in condenser 65, after which the solvent is returned through line 66 into the storage tank 1.

The vapor lines 26, 28, 47, 67 etc. are all combined and led into gasholder 68. From here the gases are drawn out through valve 69 into compressor 70, condenser 71, valve 72, line 73, and the liquefied solvent finally returned to storage tank 1.

An alternative flow arrangement which is more countercurrent in effect is shown in Fig. 2. The flowers in feeder 74 are run into extractor 75 having an extension 76 equipped with an opening having screen 77 and settling zone 78. The flowers are forced by conveyor 79 into vessel 80 for disposal as in Fig. 1. The fresh solvent enters line 81, thence to line 82 and/or 83, into extractor 75 and out through line 83 and/or 84.

Figure 3 illustrates a batch method which may be employed to give similar although not as effective results. The extractor 85 containing the material 86 to be extracted is filled with light hydrocarbon under pressure by means of line 87 and valve 88. Coil 89 is employed to give the heating or cooling desired. Upon completion of extraction, the hydrocarbon solution is withdrawn through screen 90, valve 91 and line 92 into chiller 93. Line 94 and valve 95 are employed whenever additional solvent or other material is to be added to the extract.

Chiller 93 is equipped with cooling or heating coil 96 and vapor line 97 equipped with valve 98. The hydrocarbon solution may be first cooled by coil 96 and/or by evaporation of hydrocarbon through valve 98. Separation of insoluble layer 99 occurs and then the supernatant hydrocarbon solution is drawn off through valve 100 and line 101 into fractionator 102. The insoluble material 99 is drawn off through valve 103 and line 104, with the aid of heat from coil 96, if necessary. Line 105 and valve 106 are provided for introduction of any material to the hydrocarbon solution prior to distillation.

Upon entering fractionator 102, the solvent is removed through valve 107 and line 108, while the extracted product is drawn off at valve 109 and line 110.

The extraction is carried out under sufficient pressure to maintain the solvent in liquid phase. This is generally in the neighborhood of 5 to 300 lbs. per sq. in., depending on the temperature which may be $-80°$ F., $-20°$ F., $0°$ F., $40°$ F. or sometimes as high as 100 or 150° F., but preferably at about room temperature.

The dewaxing or deresinifying step may be carried out at atmospheric pressure to 100 or 200 lbs., depending on the temperature which is preferably below 30° F. and sometimes as low as $-10°$ F., $-40°$ F., $-80°$ F. or $-100°$ F. A liquid phase must be maintained, although the solvent may be vaporized from $\frac{1}{16}$ to $\frac{1}{4}$ or $\frac{1}{2}$ of its volume for refrigeration purposes.

After separation of the solid or liquid insoluble matter by settling, centrifuging, filtration, or the like, the light hydrocarbon solution may be employed as a perfume or subjected to other uses, as such, or blended with other essences, solvents, bases, etc., the light hydrocarbon acting as an atomizing liquid. Or, the light hydrocarbon solvent may be evaporated off at atmospheric pressure, or elevated pressure, say at 50, 100, or even 300 lbs. per sq. in., depending upon the temperature desired, which may range from 150° F., 70° F., 0° F., $-30°$ F., $-50°$ F., or $-80°$ F., but preferably at room temperature, or even better, below 0° F.

The amount of hydrocarbon solvent employed may be from 1 lb. per lb. of material to be extracted to 3, 5, or even 10 or more pounds.

To the light hydrocarbon prior to extraction may be added small amounts of modifiers, such as phenolic compounds (phenol, cresol, etc.), sulphur dioxide, chlorinated hydrocarbons, fatty oils, alcohols such as methyl, ethyl, isopropyl, butyl, benzyl, etc., aldehydes (acetaldehyde, crotonaldehyde, benzaldehyde), benzol, furfural compounds, nitro-benzene, dichlorethyl ether, dioxan, ketones such as acetone, methyl ethyl ketone, etc., water, carbon dioxide, etc. The proportions of such ingredients added may be from a fraction of a percent to 5%, 10%, or 20%, but generally not over 40%.

Both the extraction and dewaxing stages may be preceded or followed by percolation or filtration through clay or other active adsorbent, treatment with sulphuric acid, and similar reagents.

Some of the raw materials which may be treated in this manner are: flowers, roots, herbs, vegetables, leaves, fish liver, animal glands, bark, nuts, fruits, spices, and the like. They may be extracted in their natural form or first dehydrated, dried, frozen, or otherwise treated.

The following is an example of one of the methods for carrying out this invention:

Example 1

About 670 grams of dried lavender flowers are digested with 3200 cc. of propane at 75° F. and about 150 pounds per square inch for 24 hours, and the propane solution is bled off through a cloth filter. On evaporation of the propane, 10 gms. of a waxy material having a strong lavender odor and yellowish green color is left behind, equal to 1.5% of the dried flowers. The flowers are digested a second time with 2750 cc. of propane, giving a total of 2.25% extracted material.

Example 2

The example is carried out as in Example 1, with the exception that instead of evaporating the propane off completely, only about ¼ of it is vaporized at atmospheric pressure, the vaporization causing the whole solution to cool down to about −30 to −50° F. The liquid propane solution is then filtered off from the separated solid wax, resin, etc., after which it is evaporated off completely as in Example 1, leaving behind a light liquid having a powerful lavender odor.

Although certain specific embodiments of the invention are shown, it is apparent that many modifications thereof are possible. The invention, therefore, is not to be restricted to any examples or illustrations except insofar as is necessitated by the prior art and by the spirit of the appended claims.

We claim:

1. Method of extracting perfume materials unstable to heat, comprising subjecting matter containing same under pressure to the action of a hydrocarbon solvent having 2-4 carbon atoms, separating the solution from the unextracted matter, subjecting the solution to refrigeration until a separation of phases occurs, separating the phase rich in the hydrocarbon solvent and removing the hydrocarbon solvent therefrom by distillation.

2. Method according to claim 1 in which the refrigeration is accomplished by evaporation of some of the solvent from the solution.

3. Method of extracting perfume materials unstable to heat matter containing same, comprising subjecting such matter under pressure and at 0–150° F. to the action of a hydrocarbon solvent having 2-4 carbon atoms per molecule in the proportion of one to ten pounds of solvent per pound of matter to be extracted, separating the hydrocarbon solution from the unextracted portion, cooling said hydrocarbon solution to −10 to −80° F., separating the hydrocarbon solution from the precipitated matter, and removing the solvent from the resulting solution by distillation of the solvent at −80 to 150° F.

4. Method for extracting heat sensitive perfume essences and purifying the same, comprising extracting the essence bearing raw material with a liquefied hydrocarbon solvent of 2-4 carbon atoms while under pressure, separating the solvent containing a crude extract from the unextracted residue, chilling the extract by evaporation of a portion of the solvent under reduced pressure so as to cause precipitation of an impurity from the extract, separating the solid impurity from the liquid materials, and then separating the extract from the solvent by evaporating the latter.

PHILIP L. YOUNG.
PETER J. WIEZEVICH.